Patented Mar. 3, 1925.

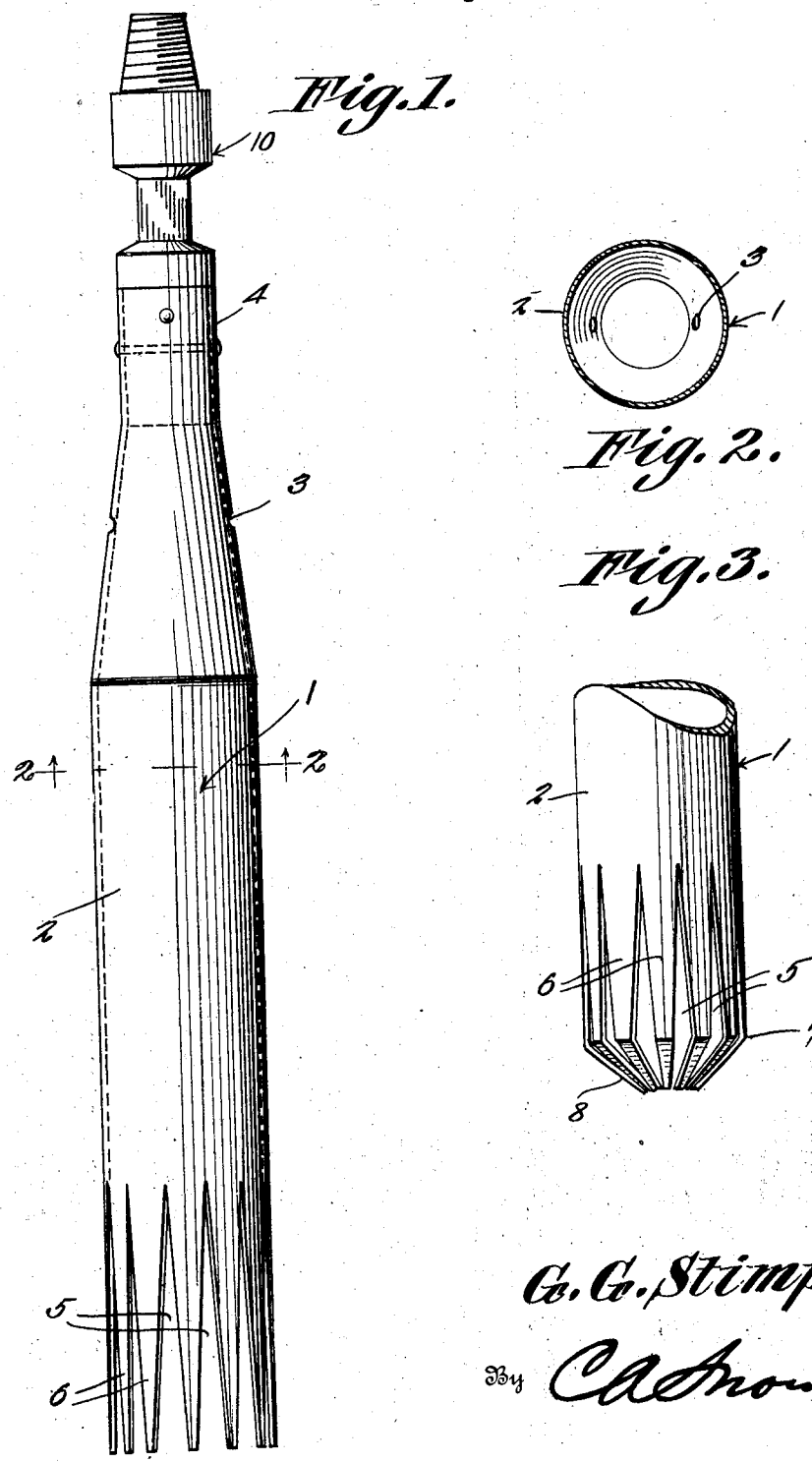

1,528,089

UNITED STATES PATENT OFFICE.

GROVER G. STIMPERT, OF BLACKWELL, OKLAHOMA.

FISHING TOOL.

Application filed August 24, 1922. Serial No. 584,060.

*To all whom it may concern:*

Be it known that I, GROVER G. STIMPERT, a citizen of the United States, residing at Blackwell, in the county of Kay and State of Oklahoma, have invented a new and useful Fishing Tool, of which the following is a specification.

This invention relates to fishing tools for the recovery from a well or hole being bored of detached portions of drilling devices such as underreamer lugs and the like.

The object of the invention is to provide simple and positive means for easily and quickly removing underreamer lugs, bolts or other small objects which may have accidentally fallen into or been displaced in the bottom of the well.

In the operation of sinking oil wells hard stratas of rock are likely to be encountered and underreamers are used to enlarge the hole. These reamers have lugs which often become loosened from the tool and fall into the hole being drilled. The tool constituting this invention is designed to pass down and around the sides of the objects to be removed having fingers which are sufficiently pliable to bend underneath the object by the application of such pressure or force as can be applied by the usual jars of a well drilling rig.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:

Figure 1 represents a side elevation of a tool constructed in accordance with this invention shown applied ready for use.

Fig. 2 is a transverse section taken on the line 2—2 of Fig. 2; and

Fig. 3 is a detail side elevation of the lower portion of the tool with the fingers shown in the position assumed when bent around the object to be removed.

In the embodiment illustrated the tool 1 constituting this invention comprises a skirt having an elongated tubular body portion 2 preferably constructed of sheet metal or any suitable pliable material and which is equipped near its upper end with a plurality of apertures 3 to permit the water entering the tube to pass out. As shown this member 1 tapers toward its upper end and has a reduced cylindrical extension 4 which is designed to be riveted to the well drilling apparatus shown at 10.

The lower end of the tubular member 2 has a plurality of inwardly extending substantially V-shaped slots 5 which form fingers 6 tapering throughout their length towards their free ends. Any desired number of these fingers may be provided and are adapted to be given a permanent set at the bend 7 with their lower ends 8 extended inwardly to provide a basket like cage said fingers being close together and contacting at their upper and lower ends to encircle and hold the lug or other object to be removed. The bending of these fingers is effected by driving them down against the bottom of the hole being drilled. The ends of these fingers are blunt to prevent them from digging into the bottom of the hole.

The length and taper of the fingers 6 admits of a slight resilience but their temper is not sufficient to prevent the points from being bent and set so that they will remain in bent position when driven down with sufficient force. The taper of the fingers adapts them to act like the fingers of a human hand rendering it impossible for a lug to drop out between them.

In operation, assuming that a lug has fallen to the bottom of the well and must be removed before drilling can be resumed, the fishing tool 1 is attached to the sub 10 and the latter secured to the jar not shown. The fingers 6 are then compressed until they will enter the well casing and the tool is forced downward until said fingers extend down and around the lug to be removed. By operating the jars the lower ends 8 of the fingers will be bent or crimped as shown in Fig. 3 underneath the lug to be removed and being composed of pliable metal will be given a permanent set or crimp so that when the fishing tool 1 is drawn out the permanent bent ends of the fingers will carry out the object to be removed.

It will be seen from the foregoing description that any obstruction may be removed from a well easily and quickly and when the tool has been removed from the well the fingers 6 owing to their pliable nature may be straightened out without the use of heat to release the object and will be ready for use again when necessary.

The body portion 2 of this tool 1 is made sufficiently long so that should any of the fingers 6 be worn or broken other fingers may be provided by further slitting the tube.

I claim:

1. A fishing tool for wells comprising a tubular pliable metal body member having one end thereof provided with V-shaped slots having their apices extended inwardly to form gripping fingers tapering in width from their bases to their free ends, said fingers being adapted to close up and be permanently bent around and made to grapple an obstruction to be removed.

2. A tool of the class described comprising a stub and a tubular skirt portion detachably connected, said skirt having an elongated cylindrical body with a tapered upper end merging into a reduced cylindrical terminal for engagement with said stub, said skirt being provided at its lower end with a plurality of longitudinally extending tapered pliable fingers having blunt points.

In testimony that I claim the foregoing as my own, I have hereto affixed my signature in the presence of two witnesses.

GROVER G. STIMPERT.

Witnesses:
   E. W. EISFELDER,
   L. A. SHAW.